United States Patent [19]
Morris

[11] Patent Number: 5,815,523
[45] Date of Patent: Sep. 29, 1998

[54] VARIABLE POWER HELIX LASER AMPLIFIER AND LASER

[75] Inventor: Henry B. Morris, Mesa, Ariz.

[73] Assignee: McDonnell Douglas Corporation, St. Louis, Mo.

[21] Appl. No.: 758,003

[22] Filed: Nov. 27, 1996

[51] Int. Cl.$^6$ ................................. H01S 3/06; H01S 3/07
[52] U.S. Cl. ............................................................. 372/66
[58] Field of Search .................... 372/66, 40, 41

[56] References Cited

U.S. PATENT DOCUMENTS

| | | | |
|---|---|---|---|
| 3,308,395 | 3/1967 | Sorokin | 331/94.5 |
| 4,740,983 | 4/1988 | Azad | 372/66 |
| 4,747,111 | 5/1988 | Trutna et al. | 372/66 |
| 4,782,495 | 11/1988 | Azad | 372/99 |
| 4,912,713 | 3/1990 | Longhans | 372/66 |
| 4,996,693 | 2/1991 | Case, Jr. et al. | 372/66 |
| 5,007,065 | 4/1991 | Trutna | 372/66 |
| 5,231,642 | 7/1993 | Scifres et al. | 372/45 |
| 5,291,503 | 3/1994 | Geiger et al. | 372/21 |
| 5,479,430 | 12/1995 | Shine et al. | 372/66 |

Primary Examiner—Rodney B. Bovernick
Assistant Examiner—Robert E. Wise
Attorney, Agent, or Firm—Robert Westerlund; Raymond Powell

[57] ABSTRACT

A variable power laser device includes a lasing medium having first and second end faces disposed parallel to one another, N side faces extending between the first and second end faces and a bevel face located at an intersection between the second end and one of the side faces, a first mirror separate from the first end face for directing a laser beam into the lasing medium so as to permit the laser beam to follow a helical transmission path defined by the N side faces, the transmission path being longer than the length of any of the N side faces, and a second mirror separate from the second end face for receiving an amplified laser beam output by the lasing medium and reflecting the amplified laser beam in a predetermined direction, wherein N is an integer greater than or equal to 3. The output power of the amplified laser beam is dependent on the number of loops in the transmission path. The tilt angle of the first mirror can be selectively adjusted to thereby selectively vary the number of loops in the helical transmission path, and, thereby selectively vary the power of the output laser beam. The laser device can include one or more laser diode arrays for pumping the lasing medium.

18 Claims, 3 Drawing Sheets

VARIABLE POWER HELIX LASER AMPLIFIER AND LASER

BACKGROUND OF THE INVENTION

The present invention relates generally to laser devices and laser amplifiers. More specifically, the present invention relates to variable power lasers and laser amplifiers using variable length helical transmission paths.

Since the invention of the ruby laser decades ago, the majority of the solid-state lasers and laser amplifiers have been cylindrical rod lasers and cylindrical rod laser amplifiers. Until a few years ago, these cylindrical rod lasers were flash-lamp pumped, but now laser diode pumped rod and slab lasers are fairly common.

Whether flash-lamp pumped or diode pumped, rod lasers suffer from a fundamental gain limitation. The available path length over which the laser beam can propagate and be amplified is limited to the length of the rod less the portions at each end that are not optically pumped. This necessarily limits the maximum gain that can be achieved. The cylindrical rod laser 1 depicted in FIG. 1 has a path length L which is less than the actual rod length. For the laser of FIG. 1, the gain, G, is defined by the following equation (1):

$$G = \exp(a \cdot L), \tag{1}$$

where a is the saturation gain per unit length of the cylindrical rod. The available gain is strongly dependent on the path length L and is, therefore, limited by the rod's length. It will be noted that even in Nd:glass rod lasers, the length of the rod is limited by the ability to produce long sections of homogeneous material including homogeneous Nd doping. The length of high gain crystalline laser media such as Nd:YAG, Nd:GGG, Nd:GSGG, and others, with good crystalline quality is more limited than the length of glass media.

Solid-state zig-zag slab lasers have become increasingly common, primarily due to their ability to circumvent the geometrical gain limitations of equation (1), to a significant extent, by forcing the laser beam to propagate over a path longer than the slab length. As illustrated in FIG. 2, total internal reflection between the slab sides 12, 14 results in laser beam propagation in a zig-zag path. It will be appreciated that in a zigzag slab laser, the zig-zag path due to total internal reflection results in a gain path length modestly greater than the length of slab 10. The increase in path length L is only moderate because the number of bounces between side walls 12, 14 is limited by the need to inject the beam at a critical angle permitting total internal reflection of the beam within the slab 10.

It will be appreciated that the same geometrical gain path constraints discussed above on connection with rod lasers also apply to zig-zag slab lasers and rod laser amplifiers.

A significant improvement in overall device gain has been achieved by the use of a helical path through a laser amplification material having a hollow axial bore and a polygonal outer configuration. An exemplary device of this type is disclosed in U.S. Pat. No. 4,470,983 issued to Azad, which is herein incorporated by reference for all purposes. Azad notes that thermal gradients formed within the lasing medium by cooling a rod laser's external surfaces result in thermal distortion of the coherent light wavefront passing through a cylindrical rod. More specifically, the distortion takes the form of a positive lens effect and adversely affects both the operating efficiency of the rod laser as well as the quality of the beam delivered by the rod laser.

One solution to this problem is to configure a slab so that multiple reflections of the coherent light beam within the slab occur between two optically plane surfaces bounding the slab thickness. With such a configuration, thermal distortion in the thickness-wise dimension can be substantially eliminated. However, in the width-wise dimension orthogonal to the thickness and defining the width of the optically plane slab surfaces, at least one of which is optically pumped and cooled, thermal distortion is experienced in regions near the edges of the slab width. This width-wise distortion is due in part to the difficulty of providing uniform optical pumping and cooling of the optically plane surface. In order to minimize such width-wise distortion, the coherent beam can be restricted from passage through such edge regions. Thus, while the face-pumped laser provides a substantial improvement over the rod laser, it is restricted to utilizing less than the entire lasing medium slab in order to minimize the effects of width-wise wavefront distortion. In order to overcome the inherent distortion present in the slab laser device, Azad proposed a laser apparatus configuration which avoided the shortcomings of the rod laser.

As shown in FIG. 3, Azad proposed an optically pumped laser device 100 including a lasing medium 102 having a longitudinal axis 104 and a regular polygonal cross section, e.g., a hexagon, perpendicular to axis 104. Lasing medium 102 is a homogeneous body of solid state lasing material such as yttrium aluminum garnet (YAG) doped with neodymium (Nd:YAG) or neodymium doped glass. Lasing medium 102 includes end surfaces 106 and 108 each having a hexagonal cross section.

Lasing medium 102 further includes six optically plane external faces 110a–110f each extending between end faces 106 and 108 and corresponding to respective ones of the six sides of the hexagonal cross section. The external faces are generally referred to hereinafter by the reference numeral 110. Each face 110 is polished to within one-eighth of the wavelength of the coherent light emitted by lasing medium 102. The lasing medium includes an inner surface 112 having a circular cross section coaxial with axis 104. Inner surface 112 defines an interior space in which is positioned means, such as a lamp 114, for optically pumping lasing medium 102. Lamp 114 is cylindrical in shape and positioned coaxially with axis 104. The lamp extends to or beyond ends 106 and 108 so that the pumping electromagnetic radiation emitted by the lamp impinges uniformly over the entire area of interior surface 112, including those portions of that surface proximate ends 106 and 108. Lamp 114 is a flash-type lamp which emits optical electromagnetic radiation at wavelengths suitable for exciting the atoms of lasing medium 102 to a metastable state. For example, lamp 114 can be a xenon flashlamp, which provides a pumping wavelength of between 5,000 and 9,000 Å for pumping a lasing medium composed of Nd:YAG or neodymium doped glass. With interior surface 112 and cylindrical lamp 114 being coaxial and lamp 114 selected to have a smaller diameter than the circular cross section of interior surface 112, an annular region is formed between the lamp and interior surface. This annular region which by geometry is substantially constant in cross section over the entire length of the lasing medium, forms a first coolant channel 116 for channeling, during operation of the device 100, the flow of a fluid coolant over interior surface 112 of lasing medium 102. The fluid coolant may be liquid or gaseous, exemplary liquid coolants being water or a liquid fluorocarbon (e.g. FC-75), while air and helium are exemplary gaseous coolants.

Device 100 also includes a circumferential flow tube 118, for example composed of clear glass, positioned to completely surround lasing medium 102. Flow tube 118 has a circular cross section and is coaxial with axis 104 so that a uniform second coolant channel 120 is formed between the flow tube and the external faces of lasing medium 102. Second channel 120 enables channeling the flow of a fluid coolant over external faces 110 of the lasing medium. A circumferential reflector 122 is mounted coaxially with axis 104 and in contact with flow tube 118. A reflecting surface 124 of reflector 122 confronts the external faces of lasing medium 102 so that pumping radiation emitted by lamp 114 and transmitted through the external faces of lasing medium 102 is uniformly reflected back onto those faces. The length of reflector 122 is coextensive with lasing medium ends 106 and 108 to assure such uniform reflection over the entire length of the lasing medium including the portions of the external surfaces proximate the ends. Reflector 122 is constructed from gold or silver plated brass.

External face 110a of the lasing medium includes two prisms 126 and 128 positioned thereon for introducing and extracting a beam of coherent light. The prisms are preferably formed as an integral part of the lasing medium. Prisms 126 and 128 respectively include faces 130 and 132 through which the coherent light beam may be introduced and/or extracted. The prisms are positioned so that the coherent light beam follows a helical course between prism faces 130 and 132 by totally internally reflecting off of each external face 110 of lasing medium 102. A path 134 of an exemplary single light ray following such a helical course between prism faces 130 and 132 is illustrated in FIG. 3. Access to the prism faces to enable introduction/extraction of a coherent light beam may be accomplished by providing appropriately positioned openings (not shown) in flow tube 118 and reflector 122.

During operation, with pumping lamp 114 operating and coolant being flowed through cooling channels 116 and 120, device 100 is operated as either a laser oscillator or a laser amplifier. When operating as a laser oscillator, a 100 percent reflective mirror would be positioned in front of one of the two prisms faces 130,132 to reflect coherent radiation emitted therefrom back along the same helical course. A second partially transmissive mirror would be positioned in front of the other prism face to enable partial extraction of the coherent radiation and reflection of the nonextracted portion of radiation back along the helical course. When operating as a laser amplifier, a beam of coherent light is simply introduced through one of the prism faces 130,132 and, having been amplified, extracted through the other face.

The laser 100 proposed by Azad solves the wavefront distortion problem experienced in the prior art rod laser in a manner different from the face-pumped slab laser. More specifically, the wavefront distortion problem is solved by the provision of the lasing medium with a polygonal cross section, that cross section being a regular polygon, i.e., a polygon having planar sides of equal length and equal internal vertex angles.

The laser oscillator/amplifier 100 proposed by Azad, while minimizing distortion due to thermal gradients has other drawbacks and shortcomings. One drawback is that the annular configuration of the laser medium increases the amount of real estate occupied by the lasing medium without increasing the output power correspondingly. One shortcoming is that the laser device 100 produces a fixed gain. The present invention was motivated by a desire to overcome these and other drawbacks and shortcomings of the presently available technology.

SUMMARY OF THE INVENTION

Accordingly, an overall object of the present invention is to overcome the above-described drawbacks and shortcomings of the presently available technology. More specifically, one object of the present invention is to increase the maximum possible gain by increasing the longest possible path through the rod that the laser beam can traverse. According to one aspect of the present invention, the square rod configuration of the inventive laser amplifier/laser provides a square helix gain path having a length many times longer than the length of the rod, which results in much larger gain. According to another aspect of the invention, the solid square rod used in the present invention maximizes gain while minimizing the footprint of the lasing medium.

Another object according to the present invention is to provide a laser amplifier in which uniform pumping is achieved using a plurality of two-dimensional laser diode arrays. According to one aspect of the present invention, the laser amplifier of the present invention maintains a constant and uniform distance between the pump array of laser diodes and the rod.

A further object according to the present invention is to provide a laser/laser amplifier with a high pump-energy conversion factor. More specifically, since the transmitted laser beam propagates close to the surface of the rod, where the pump intensity is higher than the intensity along the axis of the rod, pump-energy conversion is more efficient, resulting in a more efficient laser/amplifier that requires less power to operate. Another aspect of the present invention is that the higher efficiency in the laser/amplifier results in less cooling power required for a given output power. It should be noted that this is not the case with the Azad configuration, in which the optical pumping occurs from the inside, while the laser beam propagates close to the external surfaces, which results in lower efficiency.

Still another object according to the present invention is to provide a laser/laser amplifier whose gain path length and, hence, output power is adjustable.

Yet another object according to the present invention is to provide a laser/laser amplifier whose output power varies as a function of impingement angle of the laser beam(s) with respect to the lasing medium.

Another object according to the present invention is to provide a laser/laser amplifier whose output power varies as a function of transmission path length through a rod of lasing medium.

Still another object according to the present invention is to provide a laser amplifier whose output power is controllable responsive to angular adjustment of a movable mirror or other optical input component.

These and other objects, features and advantages according to the present invention are provided by a variable power laser device. The variable power laser device includes a lasing medium having first and second end faces disposed parallel to one another, N side faces defining a rod extending between the first and second end faces and a bevel face located at an intersection between the second end and one of the side faces, a first mirror proximate to but displaced from the first end face for directing a laser beam into the lasing medium so as to permit the laser beam to follow a helical transmission path defined by the N side faces, the transmission path being longer than the length of any of the N side faces, and a second mirror proximate to but displaced from the second end face for receiving an amplified laser beam output from the lasing medium and reflecting the amplified laser beam in a predetermined direction, wherein N is an integer greater than or equal to 3.

According to one aspect of the present invention, the output power of the amplified laser beam is dependent on the number of loops in the transmission path, and the angular orientation of the first mirror can be adjusted in order to change the number of loops in the transmission path.

These and other objects, features and advantages according to the present invention are provided by a variable power laser device, which includes a solid state lasing medium, a pivotable first mirror and a fixed second mirror. Preferably, the solid state lasing medium has first and second ends and has a longitudinal axis extending between the first and second ends and a regular polygonal cross section perpendicular to the longitudinal axis, planar external faces extending between the first and second ends and corresponding to the respective sides having the polygonal cross section, and a bevel face located at an intersection between the second end and one of the planar external faces.

According to one aspect of the present invention, coherent electromagnetic radiation directed through the lasing medium by the first mirror totally internally reflects off each of the external faces and follows a helical course between the first and second ends. According to another aspect of the present invention, the second mirror receives and reflects an amplified laser beam produced by the lasing medium and directed out of the lasing medium by the bevel face. Moreover, the output power of the amplified laser beam can be selectively varied by selectively varying the impingement angle of the laser beam, relative to the longitudinal axis by selectively varying the angular position of the first mirror.

BRIEF DESCRIPTION OF THE DRAWINGS

These and various other features and aspects of the present invention will be readily understood with reference to the following detailed description taken in conjunction with the accompanying drawings, in which.

DETAILED DESCRIPTION OF THE PREFERRED EMBODIMENTS

Figure 1:
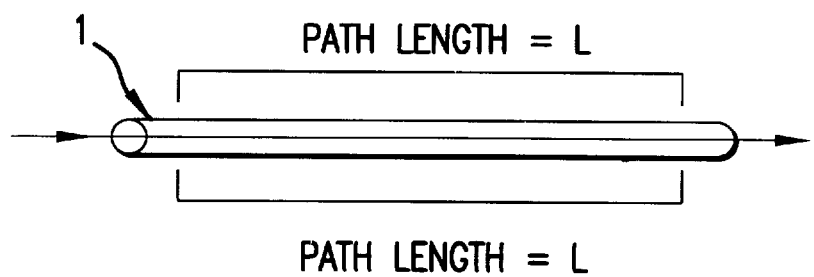
FIG. 1 is an illustration of a conventional solid state laser having a round rod gain medium.
Figure 2:
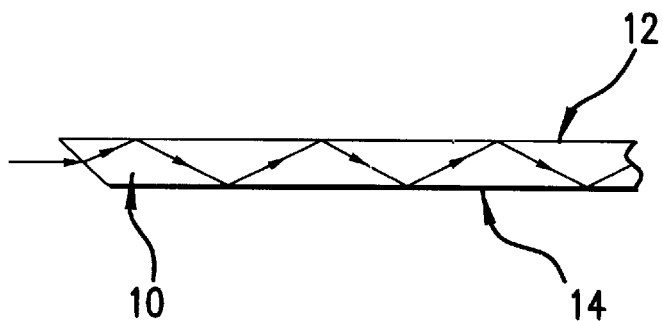
FIG. 2 is an illustration of a conventional solid slab laser.
Figure 3:
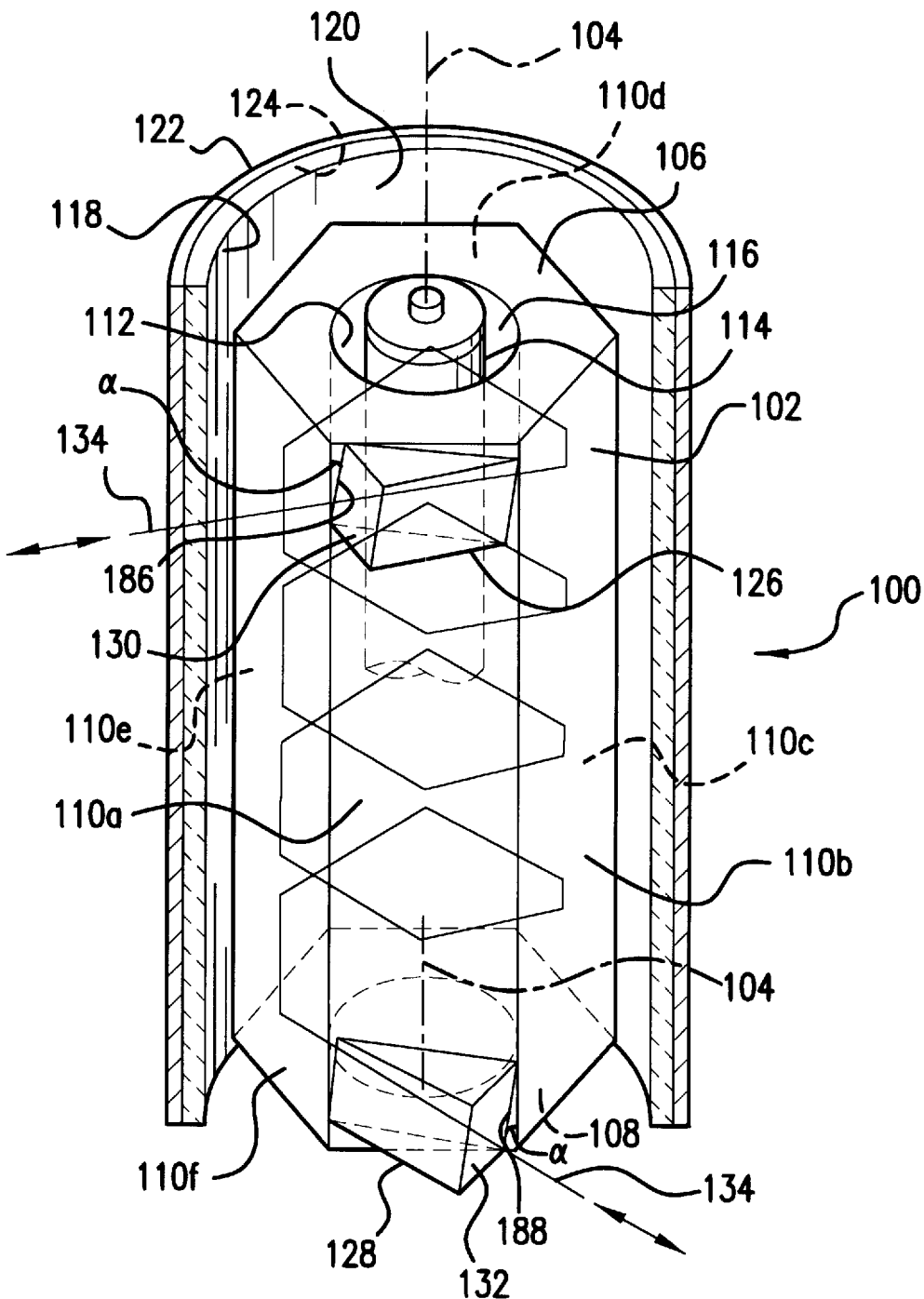
FIG. 3 illustrates a conventional solid state annular laser having a fixed amplification level.

The helix laser amplifier/laser, which will be described in greater detail immediately below, was motivated by a desire to overcome the fundamental geometrical gain limitations inherent in round rod and zig-zag slab laser amplifiers/lasers so as to produce a much larger saturation limited gain per unit rod length. Three features facilitate the achievement of a long gain path in comparison to the rod length, which features include:

a) a rod with a substantially square cross-section;

b) placement of an input mirror adjacent one end of the square rod that directs the laser beam into the rod at such an angle that multiple internal reflections occur off each of the four faces (walls) of the rod resulting in beam propagation down the rod's length in a square-helix path; and c) beveling one corner at the output end of the rod at a predetermined angle so as to direct the beam at approximately 90° to a wall so that the beam exits the rod at a predetermined point. Advantageously, the amplified laser beam can be redirected by a desired angle by an output mirror. Preferably, the desired angle is equal to 90°.

A first embodiment according to the present invention will be described with reference to FIG. 4, in which a laser 200 includes a lasing medium 202 having a substantially square cross-section. Lasing medium 202 includes first and second end faces 204 and 206, which are of approximately equal surface area and which are disposed substantially parallel to one another. Lasing medium 202 also includes four side faces 208, 210, 212 and 214, each of which is disposed either parallel to or orthogonal with the remaining three sides. Stated another way, faces 208, 210, 212 and 214 define a rod having a substantially square cross-section and end faces 204, 206 close respective ends of the square rod of the lasing medium 202. Preferably, one joint between one of the side faces, e.g., face 208, and a corresponding edge of end face 206 is beveled so as to form a face 216, which face facilitates output of the amplified or generated laser beam as discussed immediately below.

Figure 4:
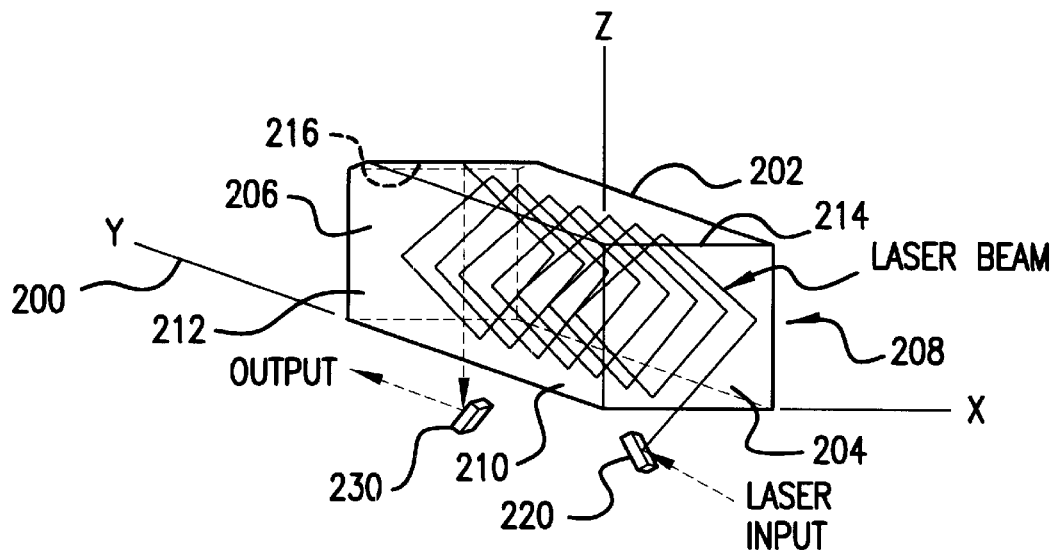
FIG. 4 is an isometric view of a laser/laser amplifier according to a first preferred embodiment of the present invention.

Preferably, as shown in FIG. 4, a first input mirror 220 is disposed proximate to the end of the lasing medium including first end 204. It should be noted that in order to insure forward propagation down the rod or lasing medium 202, the laser beam must be introduced at nearly 90° to the rod's longitudinal axis. The closer to 90° between the laser beam and the lasing medium's longitudinal axis, the more bounces occur per unit length of the square rod. It will be appreciated that when the angle is 90°, no bounces would occur and the laser beam will repeatedly traverse a flat (square) ring. It will be appreciated that since there would be no output beam produced in this situation, an impingement angle of 90° is undesirable. Preferably, the first or input mirror 220 is tiltable along at least one axis of the lasing medium 202. Thus, the number of loops in the path and, therefore, the gain of the laser or amplifier advantageously can be selectively varied by selectively varying the tilt angle of the input mirror 220. In this connection, the input mirror 220 is preferably rotatable about a pivot axis which is parallel to the longitudinal axis of lasing medium 202, e.g., by means of an electrical control signal applied to a piezoelectric transducer (not shown), which has a driving element coupled to the input mirror 220.

Preferably, the laser 200 also includes a second or output mirror 230, which is disposed proximate to the second end face 206 of lasing medium 202, and which advantageously can be fixedly oriented so as to collect the laser beam reflected from bevel face 216 along a predetermined path. Alternatively, the position of the output mirror 230 may be selectively varied so as to permit training of the output amplified laser beam.

Those of ordinary skill in the art will appreciate that in a laser configuration a cavity would be formed between the two mirrors 220, 230, with the output mirror 230 allowing a fraction of the energy incident on it to escape the cavity to provide laser output. In an alternative laser amplifier configuration, a laser beam would be amplified as it is transmitted between mirrors 220 and 230, following the square helix path within the rod of lasing medium 202.

Figure 5:
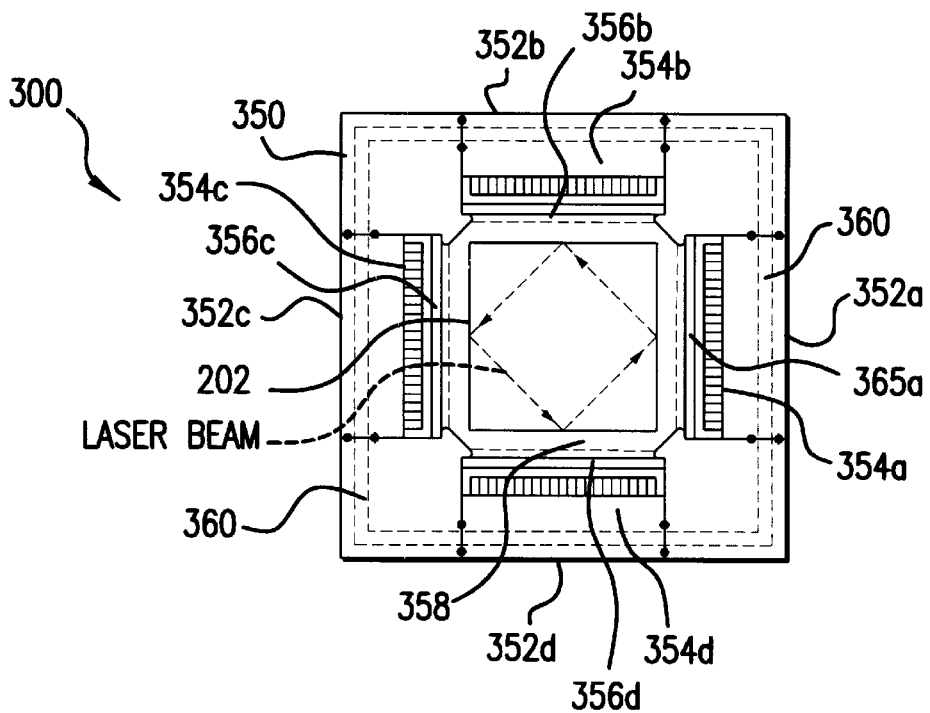
FIG. 5 is an end view of a second preferred embodiment according to the present invention which is useful in explaining the operation of the present invention in conjunction with one of more two dimensional laser diode arrays.

A second preferred embodiment incorporating a square-helix laser amplifier/laser device 300 is depicted in FIG. 5, which is an end view of the device. The laser amplifier/laser according to FIG. 5 includes a substantially square cross-section lasing medium 202 disposed between two-dimensional laser diode pump arrays 354a, 354b, 354c and 354d. Preferably, the laser diode pump arrays 354a, 354b, 354c and 354d disposed about the four sides of the lasing medium 202 provide the required excitation, but flash-lamps could advantageously be used to force the atoms of lasing medium 202 into a metastable state. It should be mentioned that the configuration of lasing medium 202 is substantially the same as the lasing medium configuration illustrated in FIG. 4. Thus, the lasing medium 202 includes first and second end faces 204, 206, side faces 208, 210, 212 and 214, and bevel face 216, even though they are not depicted in FIG. 5.

Referring to FIG. 5, the laser amplifier/laser 300 according to the second preferred embodiment of the present invention includes, in addition to lasing medium 202, a housing 350 supporting a plurality of laser diode pump modules 352a, 352b, 352c and 352d, each of which includes a laser diode bar stack or pump array 354a, 354b, 354c and 354d, respectively.

As shown in FIG. 5, the housing 350 protrudes so as to approach the four corners of lasing medium 202 formed by the intersection of faces 208 and 210, 210 and 212, 212 and 214 and 214 and 208. Preferably, glass windows 356a, 356b, 356c and 356d are disposed between the laser diode pump modules 352a, 352b, 352c and 352d and the side faces 208, 210, 212 and 214 of lasing medium 202. Glass windows 356a, 356b, 356c and 356d, together with housing 350, define a rod cooling channel 358, which is used during operation to cool lasing medium 202. It should also be noted that the laser diode pump modules 352a, 352b, 352c and 354d are cooled using coolant channel 360.

It will be readily appreciated that to those skilled in the art that both glass and crystalline gain media such as Nd:glass, Nd:YAG, Nd:GGG, Nd:GSGG, Nd:Cr:GGG, Nd:YLF, to name but a few, advantageously can be used for the lasing or gain medium 202 in the laser amplifier/laser according to the present invention. It will also be noted that, in order to achieve total internal reflection and a square-helix laser beam path, any solid-state gain medium whose critical angle is less than or equal to 45° may be used. That is, a gain medium with an index of refraction $\geq \sqrt{2}$ may be used. Of course, this requirement advantageously can be relaxed by applying a dielectric coating on the side faces of lasing medium 202, 302 so as to provide a broader range of suitable gain media.

It will be appreciated that manufacture of the square or nearly square lasing medium 202 by grinding is relatively easy, as would grinding of the output bevel at the appropriate angle dictated by the index of refraction of the gain medium 202 and any dielectric coating on the walls of the gain medium 202. Polishing of the lasing medium 202 side faces, end faces and output bevel advantageously can also be performed using conventional polishing techniques appropriate for laser slab preparation. Moreover, any desired dielectric coatings for the lasing medium's side faces, end faces and output bevel can be easily designed and applied using conventional techniques. It should also be noted that, at a minimum, the regions at which the laser beam enters and exits the lasing medium 202 should have an anti-reflection coating. Preferably, the glass windows 356a, 356b, 356c and 356d between the lasing medium 202 and the laser diode pump arrays 354a, 354b, 354c and 354d, respectively, are also provided with an anti-reflection coating using conventional techniques.

Advantageously, the laser diode pump arrays 354a, 354b, 354c and 354d can either be as long as the lasing medium 202 or a plurality of laser diode pump arrays could be disposed along and parallel to the longitudinal axis of the lasing medium 202. For long lengths of lasing medium 202, a plurality of pump arrays per side would be preferable.

Those of ordinary skill in the art will recognize that the liquid coolant, e.g., a mixture of water and ethylene glycol, supplied to the laser diode pump arrays 354a, 354b, 354c and 354d can be distributed in either a series-parallel arrangement or in a series arrangement, the latter being preferred for an exemplary case when a small number of short arrays are provided to stimulate lasing medium 202. It will also be understood that lasing medium 202 could be cooled with distilled water with the water flowing in laminar fashion along each side of the lasing medium 202 in coolant channel 358. Although the sealing of the coolant channel 358 at the ends of the square rod lasing medium 202 may be more challenging to seal than a coolant channel surrounding a round rod, one of ordinary skill in the pertinent art will have no trouble providing an adequate fluid seal.

In summary, there are at least three other advantages of the square-helix laser amplifier/laser as compared to a round rod laser amplifier/laser. First, the saturation-limited gain per unit rod length is much greater than is possible with a round rod or slab laser. Second, the pumping action provided by laser diode pump arrays will be more uniform for a square rod laser than for a round rod laser due to the flat rod surfaces of the lasing medium 202. Thirdly, the laser beam propagates closer to the surface of the lasing medium 202, where the pumping intensity is higher than along the central axis of the lasing medium. It will be appreciated that this results in more efficient pumping and, therefore, lower power consumption per watt of output power.

It should be clearly understood that while the foregoing preferred embodiments were described with respect to a lasing medium having a substantially square cross-section, other embodiments in which total internal reflections from three or more internal surfaces are used to cause laser beam to propagate along a helical path are also embraced by the present invention.

Advantageously, the above-described preferred embodiments, and variations thereof, are suitable for literally thousands of applications in place of conventional medium and high power lasers. These applications include, but are not limited to military, industrial, commercial and scientific applications. Of particular importance are airborne and space applications in which compact, low weight and high efficiency laser amplifiers/lasers are particularly desirable.

One of the greatest benefits of the present inventions is that it provides the capacity to easily change or modulate the gain, and hence output power, of the laser amplifier/laser by repositioning, e.g., adjusting the tilt/angle of, the input mirror 220. Advantageously, realigning the input mirror 220 so as to change the number of loop, i.e., the gain path length, in the propagation helix results in appreciable changes in the power output of the laser device 200. It will be noted that as the impingement angle of the laser beam directed by input mirror 220 decreases from approximately 90° to some small acute angle, the output power of the laser will decrease dramatically.

It should also be mentioned that the input mirror 220 advantageously can have a number of predetermined angles to which the mirror 220 may be rapidly positioned. It will be appreciated that this permits the laser device 200 to produce a low power beam suitable for alignment with a workpiece but to rapidly produce a high power beam suitable for material processing by shifting between an acute angle and an angle of approximately 90° to thereby increase the transmission path length. Additionally, the output mirror 230 advantageously can be also be tiltable, thereby facilitating selective adjustment of the pat followed by the output (amplified) laser beam.

Furthermore, laser 200 advantageously can be used as a combination combiner-amplifier by applying two or more laser beams via a corresponding number of mirrors 220. Assuming that each of the laser beams is applied to a different side face or different portion of the end face of lasing medium 202 at a slightly different angle, the beams can be made to reach the bevel face 216 in unison, thus permitting simultaneous output of the combined and amplified laser beams. It will also be appreciated that while the exemplary case discussed immediately above assumes constructive phase interference, two or more laser beams advantageously can be combined in such a manner as to result in destructive phase interference when optical processing is desirable.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A variable power laser device comprising:
   a lasing medium including first and second end faces, N side faces extending between said first and second end faces, and a bevel face located at an intersection between said second end and one of said side faces;
   a first input mirror proximate to said first end face for directing a first laser beam into said lasing medium so as to permit said first laser beam to follow a helical transmission path defined by said N side faces, said transmission path being longer than the length of any of said N side faces and having at least one loop; and
   an output mirror proximate to said second end face for receiving an amplified laser beam output from said lasing medium and reflecting said amplified laser beam in a predetermined direction,
   wherein N is an integer greater than or equal to 3,
   wherein output power of said amplified laser beam is dependent on the number of loops in said helical transmission path, and
   wherein an angular orientation of said first input mirror determines the number of loops in said helical transmission path.

2. The variable power laser device as recited in claim 1, further comprising:
   a second input mirror for directing a second laser beam into said lasing medium; and,
   wherein said first and second input mirrors direct said first and second laser beams to different portions of said lasing medium; and
   said first and second laser beams are combined and amplified so as to produce said amplified laser beam.

3. The variable power laser device as recited in claim 1, wherein said lasing medium comprises a rod having a square cross-section, and said helical transmission path defines a substantially square helix.

4. The variable power laser device as recited in claim 3, further comprising a plurality of laser diode arrays, each of said laser diode arrays being disposed substantially parallel to a respective one of said side faces, said laser diode arrays providing a plurality of laser beams for pumping said lasing medium.

5. The variable power laser device as recited in claim 4, wherein said lasing medium and said laser diode arrays are cooled by a liquid.

6. The variable power laser device as recited in claim 1, wherein said first input mirror has associated first and second positions and wherein said output power of said amplified laser beam when said first input mirror is in said first position is substantially less than said output power when said first input mirror is in said second position.

7. The variable power laser device as recited in claim 1, wherein said first input mirror is selectively adjustable to thereby selectively vary the number of loops in said helical transmission path and, thereby, said output power of said amplified laser beam.

8. The variable power laser device as recited in claim 1, wherein said first input mirror is disposed between planes containing said first and second end faces.

9. The variable power laser device as recited in claim 1, wherein said first input mirror is longitudinally displaced from said first and second end faces.

10. A variable power laser device comprising:
    a solid state lasing medium, including:
       a first end;
       a second end;
       said lasing medium having a longitudinal axis extending between said first and second ends and a regular polygonal cross section perpendicular to said longitudinal axis;
       planar external faces extending between said first and second ends and corresponding to the respective sides having said polygonal cross section; and
       a bevel face located at an intersection between said second end and one of said planar external faces;
    a pivotable first input mirror having an angular orientation which is adjustable to thereby selectively vary an impingement angle of a first laser beam relative to said longitudinal axis; and
    an output mirror;
    whereby coherent electromagnetic radiation directed through said lasing medium by said first input mirror totally internally reflects off each of said external faces and follows a helical path between said first and second ends;
    wherein said output mirror receives and reflects an amplified laser beam produced by said lasing medium and directed out of said lasing medium by said bevel face; and
    wherein an output power of said amplified laser beam is dependent upon said impingement angle of said first laser beam relative to said longitudinal axis.

11. The variable power laser device as recited in claim 10, wherein said polygonal cross section is square.

12. The variable power laser device as recited in claim 10, further comprising:
    a pivotable second input mirror for directing a second laser beam; and,
    wherein said pivotable first and second input mirrors direct said first and second laser beams to different portions of said lasing medium responsive to a selected output power level of said amplified laser beam; and
    said first and second laser beams are amplified and combined so as to produce said amplified laser beam.

13. The variable power laser device as recited in claim 10, wherein the laser device is a variable power laser.

14. The variable power laser device as recited in claim 13, further comprising a plurality of laser diode arrays, each of said laser diode arrays being disposed substantially parallel to a respective one of said external faces, said laser diode arrays providing a plurality of laser beams for pumping said lasing medium.

15. The variable power laser device as recited in claim 14, wherein said lasing medium and said laser diode arrays are liquid cooled.

16. The variable power laser device as recited in claim 10, wherein said output mirror is fixed.

17. The variable power laser device as recited in claim 10, wherein said first mirror is located between planes containing said first and second ends.

18. The variable power laser device as recited in claim 10, wherein the laser device is a variable power laser amplifier.

* * * * *